Feb. 10, 1931.  F. A. PARSONS  1,791,534
TRANSMISSION AND CONTROL MECHANISM FOR MILLING MACHINES
Filed Sept. 8, 1925    6 Sheets-Sheet 2

*Fred G. Parsons*
INVENTOR

Patented Feb. 10, 1931

1,791,534

UNITED STATES PATENT OFFICE

FRED A. PARSONS, OF MILWAUKEE, WISCONSIN, ASSIGNOR TO KEARNEY & TRECKER CORPORATION, OF WEST ALLIS, WISCONSIN

TRANSMISSION AND CONTROL MECHANISM FOR MILLING MACHINES

Application filed September 8, 1925. Serial No. 54,914.

This invention relates to improvements in a machine tool organization, and more particularly to transmission and control mechanism for milling machines.

A purpose of this invention is to improve a transmission and control mechanism in its details and in its combination with a particular type of milling machine, in which the relative movements of work and tool are provided for by a certain definite relationship of the movable and stationary support members, and which in combination with the improved transmission and control mechanism possesses a number of advantages not heretofore found in milling machines.

Another object is generally to simplify and improve the design, construction and operation of a milling machine organization, including the transmission and control mechanism, and including the particular type of milling machine here shown.

With these and other objects in view my invention resides in and consists of the novel constructions herein shown and described and particularly pointed out in the claims together with such modifications as do not depart from the spirit and scope of the claims, it being apparent that my invention is susceptible of a variety of equivalent modified forms.

In the drawings, in which like reference characters indicate the same parts in the several views.

A bed or stationary support A is provided with a horizontal guide way or slide upon which a table or work support B is adapted to reciprocate and with a second guide way or slide upon which a main spindle support or column C is adapted to be adjusted back and forth transversely to the direction of table movement whereby relative movement between the work and a tool spindle D is accomplished in two transverse directions in horizontal planes.

Figure 19:
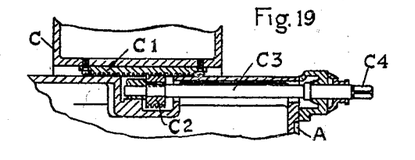
Fig. 19 is a partial vertical section line 19—19 of Fig. 12.

A spindle carrier or support E rotatably supporting spindle D is adjustable on a vertical slide on the face of the column C thus providing a third relative movement transverse to the two support movements previously mentioned. The means whereby the movement of table B may be effected will be later described. For the movement of column C a rack C1 (see Fig. 19) is fixed with the column and has angular teeth meshing with the teeth of a worm C2 fixed for rotation with a shaft C3 rotatably supported but fixed against axial movement in bed A and having an extended shaft portion provided with a squared end C4. A hand crank, not shown, may be applied to the squared end of the shaft for effecting movement of column C.

Figure 1:
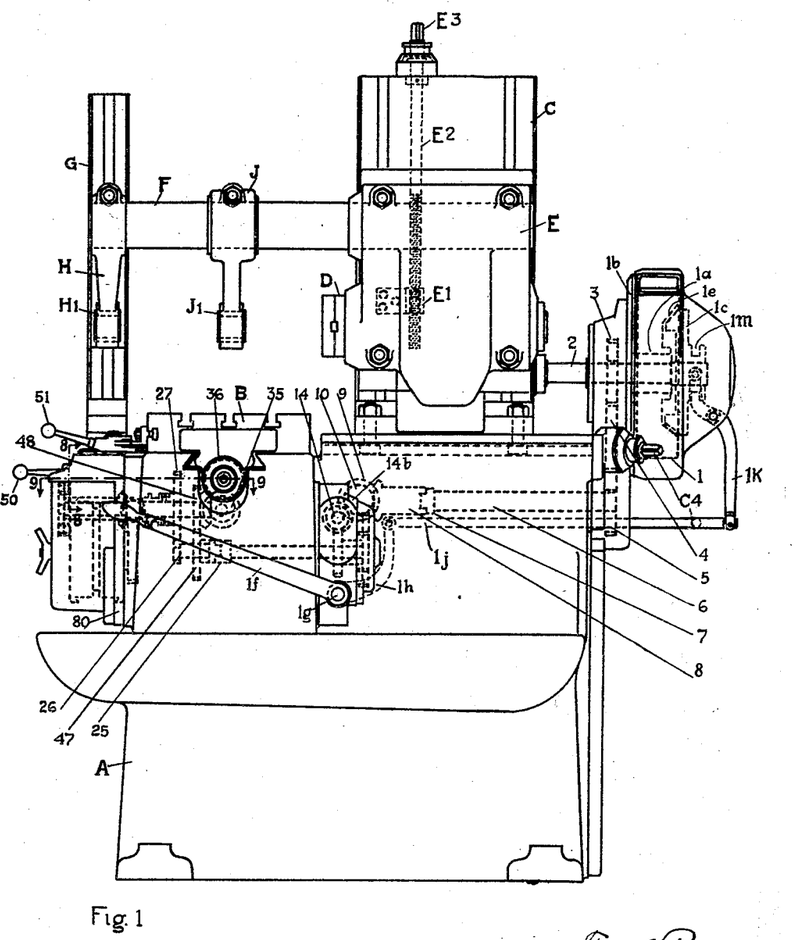
Fig. 1 is an end elevation from the right hand side of a milling machine of a type distinguished by a vertical movement of the tool spindle rather than the work. The operator normally stands at the left of Fig. 1, which is therefore here considered as the front of the machine, and stands facing the work table, and such a position will be used to identify right, left hand, and front portions of the mechanism in the following description.
Figure 2:
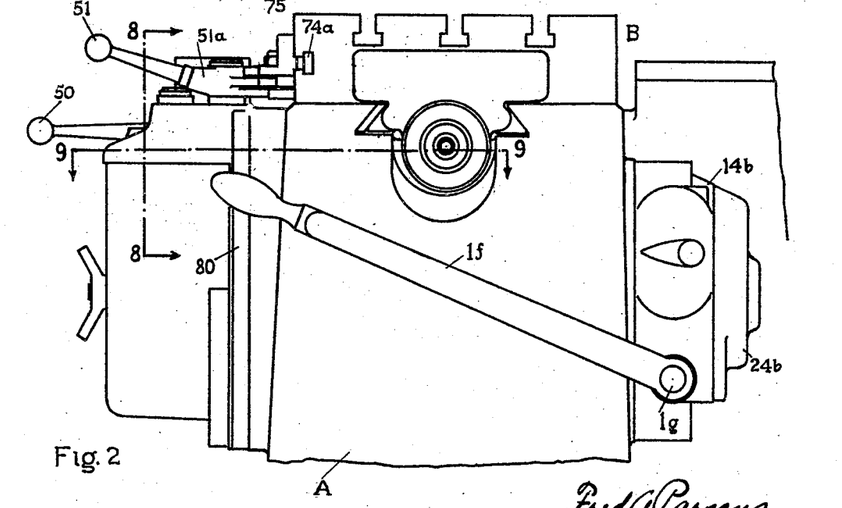
Fig. 2 is an enlarged portion of the end elevation shown in Fig. 1.

For the movement of spindle carrier E a nut E1 (See Fig. 1) fixed with carrier E engages a screw E2 rotatably supported but fixed against axial movement in the column C. Screw E2 is provided with a squared end portion E3 to which a hand crank not shown, may be applied for effecting vertical movement of the carrier.

When positioned the various supports may each be rigidly clamped in position by the means of suitable bolts which of themselves present no novelty and which are applied in a manner, except as noted below, apparent and well known to those familiar with the art and which will therefore not be particularly described. The exceptions mentioned refer to the two overarms F and associated supporting and clamping devices which form the subject matter of previous patent applications Serial No. 27,392, filed May 2, 1925, and Serial No. 27,393 filed May 2, 1925.

Overarms F are adjustably clamped in the support E and may extend out over the table B, there being means provided for rigidly supporting the ends thereof when in such position, consisting of a harness or support G removably fixed with bed A and a support member H vertically adjustably fixed thereon and adapted to engage with the overarms which may each be rigidly clamped therewith, the construction being such as to provide for the vertical adjustment of the arms F with the support E and the rigid clamping of the several structural and supporting parts in each of the several positions of adjustment.

An intermediate arbor support or pendant J is adjustably clamped to the overarms F and the supports H and J are respectively provided with arbor bushings H1 and J1, the bushings being positioned in axial alignment with the spindle D and being rigidly maintained in such a position by the described structure whereby a tool arbor not shown may project from and be driven by spindle D and be maintained in axial alignment therewith, rotating in the bearings H1 and J1.

A main pulley or driving member 1 provides a power source in the machine unit for actuating the spindle D and table B, being arranged to be driven from any suitable exterior or distant source by any of the conventional methods. The pulley revolves on the exterior surface of a cylindrical extension 1a of the housing 1b which is fixed to the bed A. An interior bore in the extension 1a provides a bearing for a shaft 2 on the one end of which a clutch member 1c is slidably mounted in axial alignment with a clutch member 1e fixed with the pulley 1. The clutch members may be moved into engagement to drive shaft 2 from pulley 1, or may be oppositely moved for disengagement, by the means of a hand lever 1f located in a position convenient for the operator and connected for movement of the clutch member 1c through shaft 1g, lever 1h, rod 1j and lever 1k which is pivoted in the clutch housing and is provided with a fork at the one end engaging with an annular groove 1m in the clutch member 1c.

When the clutch members 1c and 1e are engaged to drive shaft 2, the spindle D is rotated by spindle drive mechanism forming the subject matter of a co-pending application Serial 54,464 filed Sept. 4, 1925, which will here be only briefly described as follows:

Shaft 2 slidably engages a sleeve 100 rotatably supported in column C in a position of axial alignment with shaft 2, whereby sleeve 100 will be driven from shaft 2 in any of the positions of adjustment of the column on bed A. At the one end of sleeve 100 is removably splined a change or slip gear 101 meshing with a gear 102 removably splined on the one end of a sleeve 103 rotatably supported from a stud 104 fixed in column C. At the other end of sleeve 103 is removably splined a change gear 105 which meshes with a change gear 106 removably splined to the one end of a shaft 107 rotatably supported in the column C. A bevel gear 108 fixed for rotation with shaft 107 meshes with a bevel gear 109 rotatably supported in a swinging bracket 110 pivoted and supported to be moved about the axis of shaft 107. Slidably splined in the elongated shank of gear 109 is a shaft 111 provided with a bearing in a swinging bracket 112 pivoted and supported for movement around the axis of spindle D. Shaft 111 has fixed upon its one end or solid with the shaft a bevel gear 113 meshing with a bevel gear 114 fixed upon a hub 115 and which is splined to and supported from spindle D.

The construction above described permits of maintaining a driving relationship between shaft 2 and spindle D in any of the positions of adjustment of the column C on the bed A, and also in any of the positions of adjustment of the spindle carrier E on the column C by the means of gearing some of which may be changed or removed either to reverse the position of certain of the gear pairs or to replace certain of the gear pairs with other gears whereby the rotational speed of the spindle may be changed as desired, while maintaining a constant speed of rotation of pulley 1.

Figure 3:
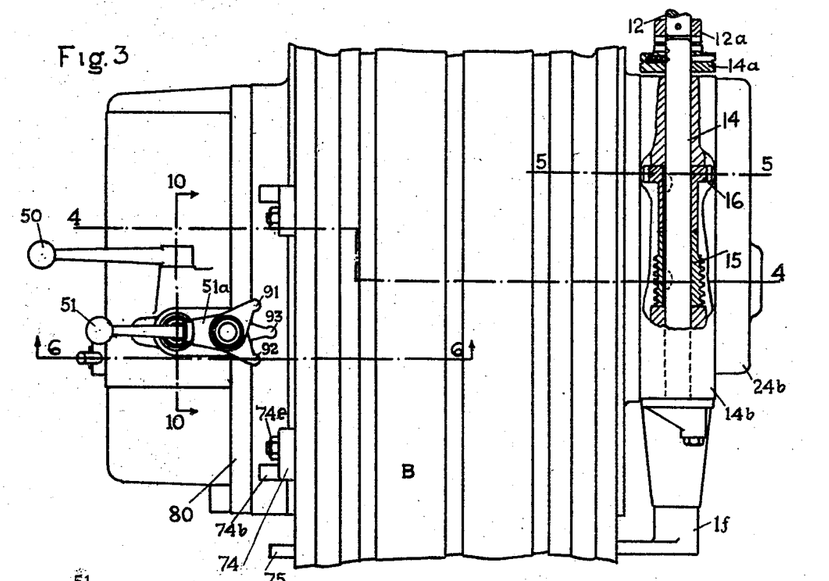
Fig. 3 is an enlarged portion of the top view or plan shown in Fig. 12, a portion being in horizontal section.
Figure 12:
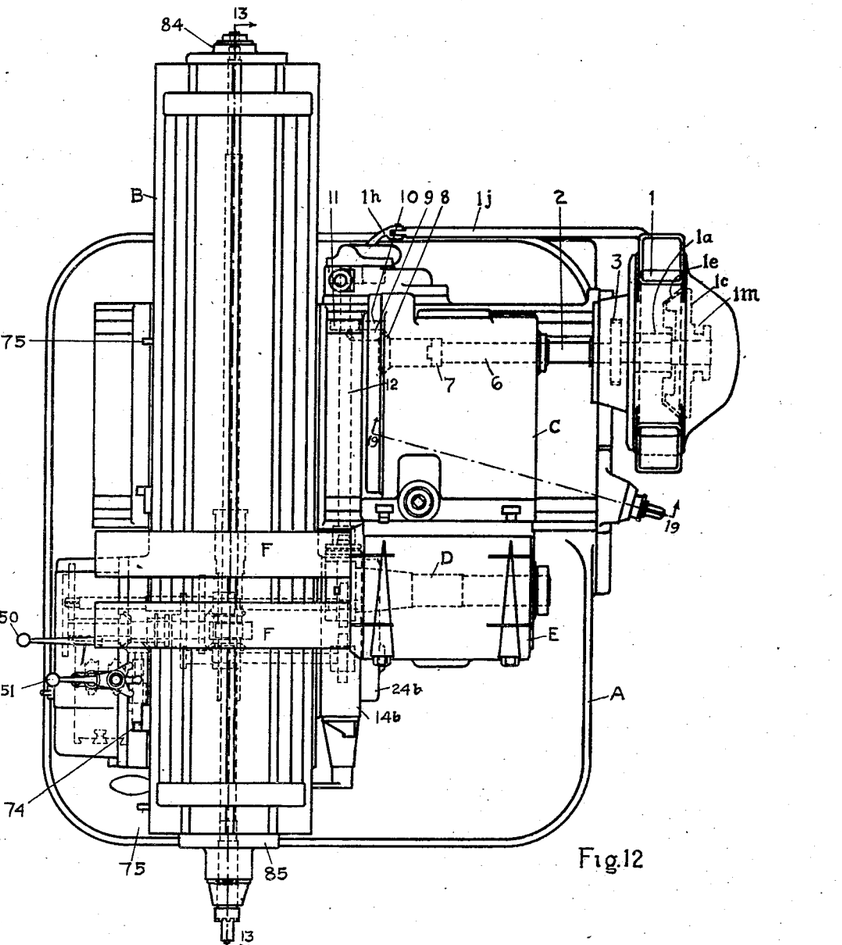
Fig. 12 is a plan view of the milling machine shown in above views, some of the structural supports shown in Fig. 1 being omitted for clearness.

A feed and quick traverse and table control transmission for table B is also actuated at least in part whenever shaft 2 is actuated as follows: Gear 3 (see Fig. 1) fixed with shaft 2 drives gear 5 through an intermediate gear 4 rotatably supported from the bed A. Gear 5 is fixed on a shaft 6 which is rotatably supported from bed A and which drives a bevel gear 8 through a coupling 7. Bevel gear 8 meshes with a bevel gear 9 rotatably supported and having fixed for rotation therewith a spur gear 10, driving the rotatable shaft 12 (see Fig. 12) through a spur gear 11 fixed thereon. The shaft 12 is supported in axial alignment with a shaft 14 rotatably supported in a case or housing 14b and which may be connected with or disconnected from shaft 12 by means of a coupling member 14a slidably keyed to shaft 14 and engageable with a complementary coupling member 12a fixed with shaft 12, see Fig. 3.

Figure 5:
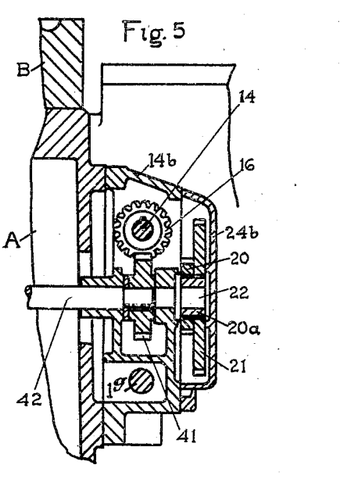
Fig. 5 is a partial sectional elevation taken along the line 5—5 of Fig. 3.

A worm 15 fixed with shaft 14 drives a worm wheel 17 fixed on a sleeve 18 rotatably supported in the housing 14b. Removably splined to the one end of sleeve 18 is a gear 19 meshing with and driving a gear 20 (see Fig. 5) removably splined to a sleeve 20a rotatably supported on a stud 22 fixed in housing 14b. Likewise removably splined to the sleeve 20a is a gear 21 meshing with and driving a gear 23 removably splined to a collar or sleeve 23a which is pinned to a shaft 24 by the means of a driving pin 24a, the shaft 24 being rotatably supported in an axial bore in the sleeve 18.

The gears 19 and 20 form a pair of gears which may be reversed in position and being of different diameter will when reversed transmit different feeding speeds to shaft 24. Gears 21 and 23 likewise form a reversible driving pair, and upon reversal will likewise transmit other feeding speeds to shaft 24. Such reversal provides several changes of feed rate and it is also contemplated that either or both pairs may be interchangeably replaced by other suitable gear pairs of different ratio which may also be reversible thus providing for a great variety of feeding speeds.

The pin 24a is suitably proportioned to fail by shearing under driving pressures or torques which would still be insufficient to break the weakest other portion of the table feed train thus providing a safety device protecting other train portions from damage if the machine is overloaded, and a removable cover plate 24b is provided to permit access to the pin 24a for replacement and also to the described changeable gear pairs for convenience in effecting the feed changes.

A shaft 26 is positioned in axial alignment with shaft 24 and is rotatably supported in a bushing 26a fixed in a case or housing 80 supported from bed A and is connected to be driven from shaft 24 by the coupling members 25 and 25a fixed on the respective shafts and having interlocking teeth.

Fixed on or integral with shaft 26 is a gear 26b which drives a gear 27 rotatably supported on the outer diameter of a sleeve or bushing 27a fixed in housing 80. The gear 27 may revolve idly on the bushing or may drive a shaft 29 rotatably supported in an axial bore of bushing 27a and in axial alignment with gear 27, through the medium of a feed clutch member or element 28 slidably splined with shaft 29 and having clutch teeth engageable when moved in the proper direction, with complementary clutch teeth on the extended hub of the gear 27.

Thus the shaft 29 may, through the mechanism above described be actuated from shaft 14, at a predetermined variable feed rate, if clutch member 28 is engaged, or may be disconnected from the feed train if clutch member 28 is disengaged.

Mechanism will now be described whereby the shaft 29 may be actuated from shaft 14 at a comparatively rapid, constant speed quick traverse rate when the feed clutch member 28 is disengaged from gear 27.

A helical gear 16 is fixed on shaft 14 and drives a mating helical gear 41 fixed on a shaft 42 rotatably supported in a suitable bearing in the box or housing 14b. Axially aligned with shaft 42 is a shaft 44 (see Fig. 11) rotatably supported in an axial bore in a sleeve member 46, which in turn is rotatably supported in a bushing 46a fixed in housing 80, the sleeve and shaft being free from independent rotation unless clutched together as later described. Shaft 44 is connected to be driven from shaft 42 by the means of toothed coupling members 42a and 44a fixed to the respective shafts and in mutual engagement.

The sleeve 46 is connected for movement with the shaft 29 by the means of a gear 47 fixed on the one end of the sleeve 46 and meshing with a gear 48 fixed on the hub of a bevel gear 30 keyed to shaft 29.

Sleeve 46 may be connected for movement from shaft 44 or disconnected therefrom by the means of a quick traverse clutch member or element 45 slidably splined with shaft 44 and provided on the one end with clutch teeth engageable with complementary clutch teeth on the sleeve 46 when member 45 is shifted in the proper direction. When the clutch 45 is so connected to drive sleeve 46 shaft 14 will drive shaft 29 through the above described train elements, without passing the drive through the variable feed gearing and without passing through gearing of large speed reduction, whereby, when so driven shaft 29 will rotate at a constant, comparatively rapid quick traverse rate.

Figure 4:
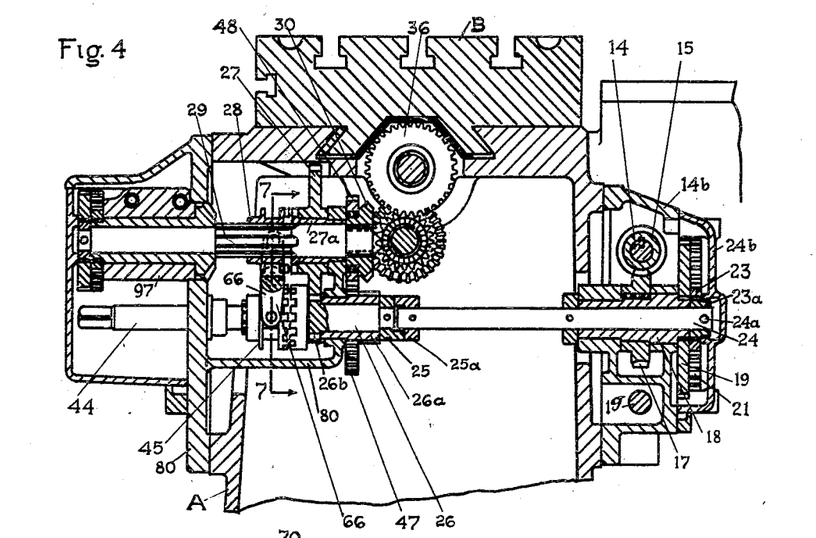
Fig. 4 is a partial sectional elevation taken along the line 4—4 of Fig. 3.
Figures 6, 7:
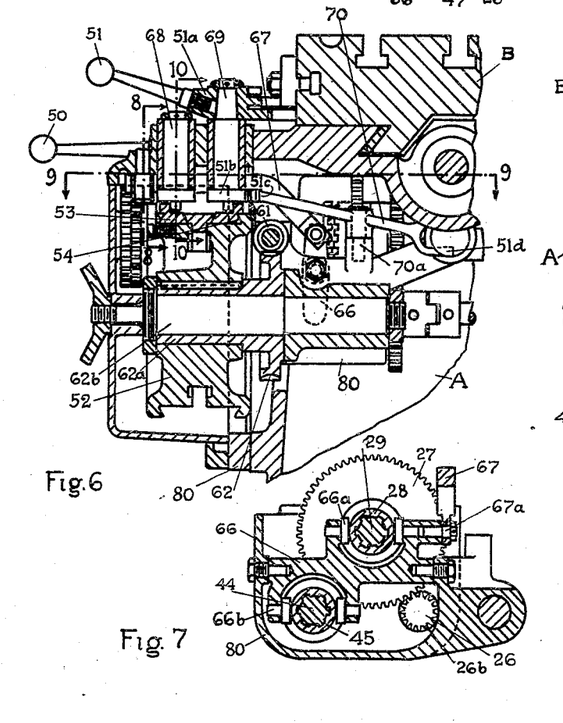
Fig. 6 is a partial sectional elevation taken along the line 6—6 of Fig. 3 and along line 6—6 of Fig. 9.
Fig. 7 is a partial sectional elevation taken along the line 7—7 of Fig. 4.

The clutch members or elements 28 and 45 are connected together for simultaneous movement by the means of a shift member or lever 66 pivoted in housing 80 (see Fig. 7 and Fig. 4). Annular grooves are provided in the respective clutch members and pivoted shoes 66a and 66b engage with the grooves of the respective members, the arrangement being such that when the clutch member 28 is engaged to be driven from gear 27 then clutch member 45 will not be in driving engagement with the sleeve 46, and vice versa. Thus shaft 29 may alternatively be driven at a feed rate from gear 27 or at a quick traverse rate from shaft 44, but simultaneous driving engagement at both rates is prevented.

Figure 13:
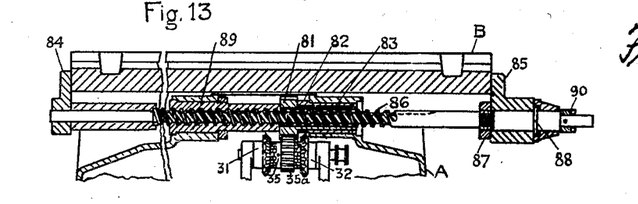
Fig. 13 is a partial vertical section along line 13—13 of Fig. 12.

The alternative feed or quick traverse movement imparted to shaft 29 may be caused to actuate table B in either direction by the means of mechanism as follows:

The bevel gear 30 previously mentioned as fixed on shaft 29 is meshed at opposite sides thereof with bevel gears 31 and 32 (see Figs. 9 and 13) which are respectively rotatably supported on the outer diameter of bushings or sleeves 31a and 32a each fixed in axial alignment in housing 80, thus giving opposite directions of rotation to the respective bevel gears. A shaft 34 is rotatably supported in axial bores in the bushings 31a and 32a and fixed on shaft 34 is a clutch member 35 having at its opposite ends clutch teeth or elements respectively adapted to engage with and be driven from complementary teeth on the bevel gears 31 and 32, when clutch member 35 is suitably shifted.

The shaft 34 together with the clutch member 35 is shiftable in either direction and when shifted in the one direction the clutch teeth or elements on the one end of clutch member 35 will engage with the complementary teeth or clutch elements on the one bevel gear, when shaft 34 will be driven in the one direction. Shifting the clutch in the other direction will engage the clutch teeth on the other end of clutch member 35 with the complementary teeth on the other bevel gear and will result in the opposite direction of drive for the shaft 34. An intermediate position of the clutch member 35 permits disengagement from both bevel gears and will cause the shaft 34 to remain stationary.

Fixed with or solid with the member 35 is a gear 35a which is meshed with a gear 81 rotatably supported in a bushing 82 fixed in bed A. Gear 81 is of wide face to maintain full engagement with gear 35a despite the described axial shifting of gear 35a with member 35.

Slidably splined in a cylindrical bore of gear 81 by the means of a key or feather 83 is a lead screw or table screw 86 rotatably journaled at its ends in table brackets 84 and 85. The bracket 85 is fixed rigidly with the table and the screw 86 is prevented from axial movement relative to bracket 85 by the means of a collar 87 threaded and locked on the lead screw, and a collar or enlargement 88 fixed on or integral with the lead screw, the table B being thereby forced to move with the screw should the screw be axially moved. To give axial movement to the screw when rotated a nut 89 fixed both against rotation and axial displacement in bed A engages with the threads of screw 86. By the transmission train mechanism described, the screw 86 may be rotated in either direction or may remain stationary and hence table B may be moved in the one or the other direction from bevel gears 31 or 32 or may remain stationary, according to the position of clutch member 35.

The screw 86 is provided with a clutch member 90 having clutch teeth suitable for engagement from complementary teeth on a suitable hand crank, not shown, whereby the screw may be manually rotated to adjust or move the table when clutch member 35 is in its central position.

The shiftable clutch member 35 and associated mechanism previously described provides a table reversing and motion interrupting mechanism, while the clutch members 28 and 45 together with associated mechanism previously described provide an alternatively available feed or quick traverse mechanism whereby the table and a control carrier to be later described may move at feed or quick traverse rates, the clutch means whereby alternative feed or quick traverse is accomplished also providing a motion interrupting means under certain conditions as will be pointed out. For these mechanisms a variety of control or trip means are provided which, while cooperating for a variety of useful results as will be later explained, may be for purpose of description, divided under the headings of hand control, table dog control and drum or carrier dog control, each of which will now be described.

The hand control or shifting of the table reversing mechanism is accomplished by the means of a hand lever 51 removably threaded in or otherwise removably fixed with a trip member 51a fixed on the upper end of a trip post or member 69 suitably journaled or pivoted in housing 80, and having at its lower end a trip member 51b fixed on or solid with the post. A lever 70 is pivoted on a pin 70a fixed in housing 80 and is provided at the one end with gear teeth 51c forming a gear segment meshing with a gear segment on the member 51b. At the other end the lever is provided with a fork 51d engaging an annular slot in a spool 34a fixed on or solid with shaft 34. The shifting of hand lever 51 may rock the post 69 and through the described connecting mechanism effect axial movement of shaft 34 and clutch member 35 for causing the table to travel in either direction or may position the member 35 centrally to cause the table to remain stationary.

The hand control of the feed and quick traverse mechanism is accomplished by the means of a hand lever 50 connected for movement of the previously described clutch lever 66 as follows. Pivoted in housing 80 is a short shaft 76 (see Fig. 10) at the one end of which the hand lever 50 is fixed and at the other end of which is fixed an arm or lever 76a. A rod 67 (see Figs. 6-7-9) is pivoted at the one end to the clutch lever 66 by the means of a pin 67a and at the other end is slotted for receiving the arm 76a. A pin 77 is fixed in the rod and passes through the arm. Thus a manual rocking of the lever 50 may through the described mechanism rock lever 66 to alternatively engage either clutch 45 or clutch 28 thereby effecting either a feeding or a rapid traverse movement of the table if the reverse clutch member 35 is in either position of engagement.

Table dog control is provided for an interruption of table movement by disengagement of clutch member 35 and is effected by the means of table dogs as follows: The member 51a is provided with oppositely extending ears or lugs 91 and 92 (see Fig. 3) and another lug 93, each of the lugs being on different horizontal levels to be contacted by different table dogs. The previously described table transmission mechanism and hand control mechanism is of such effect that when the handle 51 is rocked to the left the table will travel to the left. In such case the lug 91 will be rocked inwardly toward the front edge of the table. A dog 74 is adjustably and removably mounted at the front table edge by the means of a bolt 74e engaging a T slot 74a, and carries a projecting portion 74b suitably positioned and of suitable form and dimensions to contact with the lug 91 as the table is moved, and continued movement of the table will then force the lug back to its original position thereby moving the trip post and, through the previously described connecting members, the clutch member 35 to a central position and interrupting the power movement of the table. When the handle is moved as described, the lug 93 is moved to the right and a dog 75 is permanently fixed with the table to eventually contact lug 93 and move it back to the left again and thereby trip or disengage the table feed positively in the case that the operator neglects to put on or suitably adjust the dog 74 to trip the feed before the table over runs the limits of its left hand movement. The dog 75 thus acting as a permanent and fixed stop to prevent breakage or damage. A dog similar to dog 74 but on the other end of the table may similarly trip the table when moving in a right hand direction, such a dog contacting the lug 92; and a fixed or safety dog similar to 75 is fixed at the left end of the table to similarly contact lug 93 but on the opposite side to positively prevent the table from too great a power movement to the right. The reason for lug 93 being in a different horizontal plane is to permit the adjustable dogs to pass over the positive or fixed dog and thus provide adjustable tripping up to the extreme limit of table travel. Lugs 92 and 93 are in different planes in order that after a dog has contacted the one lug to trip the table feed the lever may be immediately moved to a position to produce a power return of the table without subsequent interference between the other lug and the dog, which must then retreat past the other lug.

A drum or carrier control of the table movement is provided in addition to the controls above described. A drum or carrier member 52, suitably journaled for rotation is given a power movement even when the table is stationary and is provided with adjustable dogs mounted on its periphery and with associated mechanism for the engagement and disengagement both of the table reversing mechanism and of the mechanism for changing the table rate from feed to quick traverse as will be now described.

Power movement is applied to the carrier 52 from the shaft 29, upon the extended front end of which is fixed a sleeve or collar 94 (see Fig. 9) to which a gear 58 is removably keyed. Gear 58 meshes with and drives a gear 57 removably keyed at the outer end of a sleeve 95 rotatably supported on a stud 96 fixed in a block or member 97 which in turn is fixed with the housing 80. The inner end of sleeve 95 carries a gear 56 removably splined thereto and which meshes with and drives a gear 55 removably splined to the extended shank of a bevel gear 59 rotatably supported in the block 97 in a position of axial alignment with shaft 29, and through the axial bore of which the outer end of shaft 29 is rotatably supported. Bevel gear 59 meshes with and drives a bevel gear 60 fixed on the extended shank or shaft of a worm 61 which is supported for rotation in housing 80 and which meshes with and drives a worm wheel 62 supported for rotation on stud 62b fixed in housing 80. The worm wheel 62 is provided with an elongated shank portion 62a upon which the drum or dog carrier 52 is removably keyed, being retained in position by the means of a nut removably threaded on the stud 62b. Through the train thus described the carrier 52 may be rotated from shaft 29, and from the above it will be seen that carrier movement is independent of whether or not the table is ever moved.

The gears 57 and 58 constitute a change gear pair which are reversible in their position in the train. The gears 55 and 56 likewise constitute a reversible change gear pair. The gears of the individual pairs are of different diameter and the two pairs are of different ratio whereby possible positions of the two pairs may effect four different driving ratios between shaft 29 and carrier 52, and a great variety of other ratios may be obtained by the use of still other suitable gear pairs interchanged with one or both of the gear pairs shown.

Figures 14, 15, 16, 17:
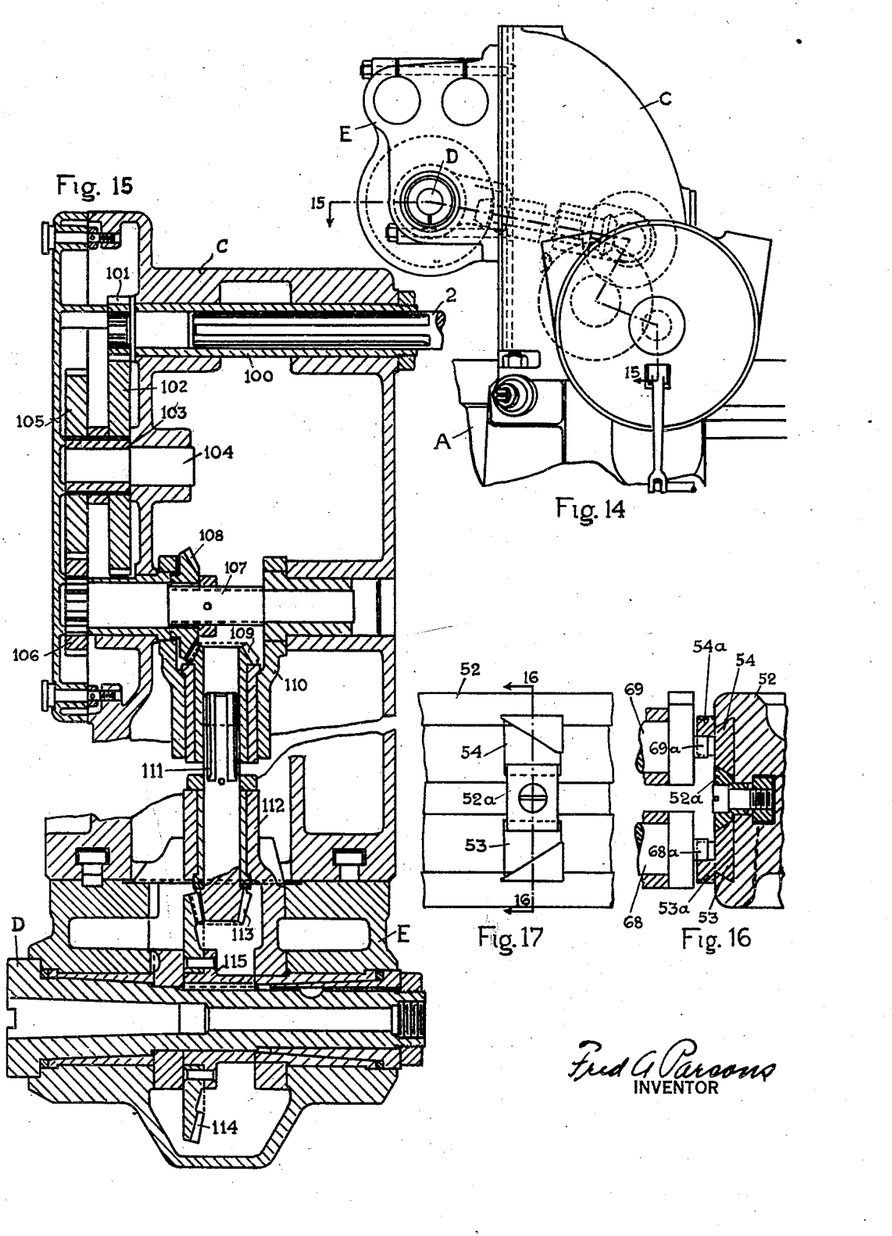
Fig. 14 is a partial rear elevation of the machine.
Fig. 15 is a sectional development of spindle drive gearing taken approximately along the line 15—15 of Fig. 14 and enlarged.
Fig. 16 is an enlarged portion of Fig. 6.
Fig. 17 is a top or plan view of a part of the mechanism shown in Fig. 16.

The drum or carrier 52 is provided with two series or rows of adjustable dogs typified by the dogs 53 and 54 (see Figs. 6 and 16). These dogs may be clamped in any position around the periphery of drum or carrier 52 by the means of clamp blocks 52a the carrier being provided with a T slot and the clamps having a screw and nut coacting therewith as shown. Although two dogs are shown with a single clamp reacting against both, a single dog may be clamped by the means of clamp 52a, the clamp being provided with an extension fitting in the T slot as shown which serves to take the clamping reaction in the absence of a second dog.

Dog 54 may rock trip post 69 as the dog is moved with the carrier. In Fig. 16 the dog is shown with an upstanding projection 54a and post 69 with a downwardly projecting lug 69a. The lug 69a is shown in a position corresponding to the central position of lever 51 and hence to a neutral or nonpower-transmitting position of the table reverser member 35. It is obvious that by suitable configuration and dimensions of the upstanding portion 54a of a variety of dogs similar to dog 54 the lug 69a may be moved to right or left in Fig. 16, or being in either of these positions may be moved back to a central position or to the other position as the dog advances with the carrier, and that a number of dogs suitably fashioned and spaced may produce these movements one after another in any order to move as desired the table reverser clutch member 35 connected with post 69 and hence with lug 69a.

The dog 53 may similarly control the clutches 28 and 45 whereby the table rate is changed from feed to rapid traverse or vice versa, as follows: A trip post 68 is suitably journaled or pivoted in housing 80 and provided with a downwardly projecting lug 68a on an enlarged head portion 68b (see Fig. 10) which is also provided with a suitable aperture to receive a ball shaped end 76b on the lever 76a, whereby motion of the lug 68a set up by drum dogs 53 may be transmitted to lever 76a and therefore to rod 67 and to the clutches 28 and 45. Since the upstanding portion 53a may obviously if suitably fashioned, rock the lug 68a in either direction as the drum or carrier advances, a number of dogs similar to dog 53 and moving with the carrier 52 and of suitable form and position of adjustment on the carrier may produce these movements, one after another at intervals in any order as desired, and thus alternate the table rate between feed and quick traverse if the clutch member 35 is engaged.

Reverser clutch 35 should be yieldingly held in a well defined central or non-driving position, and when engaged in either direction, especially when engaged from a carrier dog, should be quickly shifted to full engagement past the position of partial engagement. To accomplish this the lower end of trip post 69 is enlarged to form a cam member 69b (see Fig. 9) against which a point 72a of a member 72 pivoted on a pin 72b fixed in housing 80, is pressed by a spring 73. The cam portion 69b is formed with a central notch as shown which is positioned to maintain the clutch member 35 in its central position when the notch is engaged by the point 72a but from which position it may be shifted by overcoming spring 73. The notch is of such extent that the two points formed on the cam will respectively pass the point 72a just before the clutch engages in the one or the other directions, following which the spring pressed point 72a will react on the cam 69b to quickly shift cam and the associated parts and fully engage the clutch.

Figures 9, 10, 11, 18:
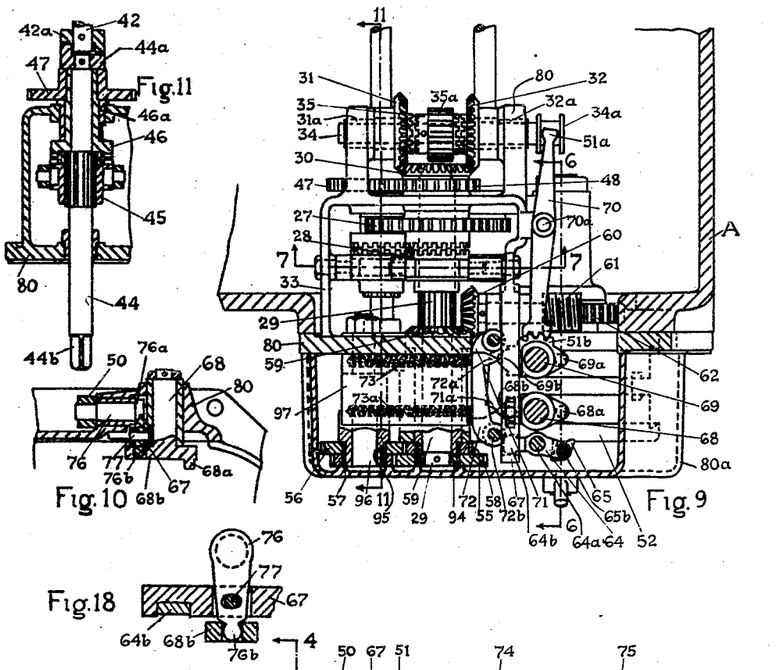
Fig. 9 is a horizontal partial section taken along line 9—9 of Fig. 2, a portion only being taken along a lower plane as will be later noted.
Fig. 10 is a vertical partial section along line 10—10 of Fig. 3.
Fig. 11 is a vertical section along a transmission shaft and associated members as indicated by line 11—11 of Fig. 9.
Fig. 18 is an enlarged vertical sectional view of a portion of the motion transmitting mechanism for the control device, as will be later described.

To effect a reversal of table movement the engagement of clutch 35 in the opposite direction should ordinarily take place immediately following disengagement. Unless special provisions were made opposite re-engagement would be delayed while the parts moved from a position corresponding to clutch disengagement through nearly the entire extent of movement corresponding to the clearance or extra space provided for the clutch, such space being necessary to allow for variations of manufacture and assembly and for other reasons. To avoid this delay lost motion is provided between some of the motion transmitting connections between the cam 69b and the clutch 35, in this case between the fork 51a of lever 70 and the annular groove in spool 34a as shown in Fig. 9, such lost motion being provided by merely making the fork a trifle narrower than the groove as there indicated. The lost motion and connecting parts are so proportioned that the cam 69b, when the clutch is moved in either direction by the means of the dog 54 will move before the clutch 35 moves, so that when the clutch finally disengages, the cam is so positioned relative to the point 72a that a very little additional dog movement will move the cam to a position where the point 72a reacts under the pressure of spring 73 to quickly engage the clutch in the opposite direction.

The post 68 is likewise provided with a cam 68b engaged by a coacting point 71a on pivoted member 71, point 71a being spring pressed by a spring 73a, but since the clutches controlled from post 68 need never be in a non-power-transmitting position except as will be later described, no central notch is provided in cam 68b, this cam having a single central point corresponding to the position of disengagement of both the clutches 28 and 45. It is desirable that these clutches should never remain in a disengaged position except as will be later described, even during the interval necessary for the carrier dogs to shift them through the extra space required for clearance or to insure that the one shall be fully out of engagement before the other engages. For this reason lost motion is provided between some of the parts connecting between the cam 68b and the clutches 28 and 45, in this case between the pin 77 and the cam 76a (see Fig. 18), such lost motion being provided by merely elongating the pin hole a trifle as there shown. The lost motion is of sufficient amount and is so positioned relative to the associated parts that, regardless of which direction the clutches are moving the point 71a will have passed over the point of cam 68b before the out moving clutch disengaged and immediately upon disengagement of the out moving clutch the point 71a will react on the cam 68b under the pressure of spring 73a to continue the movement and instantly shift the other clutch into full engagement.

It will be noted from the above description that the carrier 52 does not reverse its movements when the table is reversed, and that the rate at which the carrier is driven is proportionate to the rate at which the table operates. The proportionate rates may be changed by altering the position of gears 53, 56, 57, 58 or by replacing them with other suitable gears as previously described. It is not contemplated that the carrier movement shall be of the same linear rate as that of the table nor at any fixed ratio of comparative linear rates, but it is ordinarily desirable that, irrespective of the length of travel of the table, the carrier shall make a trifle less than one complete revolution while the table completes its advance and retreat to its starting or zero position. Thus one reciprocatory movement of the table constitutes one cycle of table movement and one revolution of the carrier ordinarily constitutes a corresponding cycle of carrier movement. The table travel may vary greatly in extent as required for different work, and it is for this reason that the carrier driving train is provided with rate change gearing, whereby irrespective of the length of table travel the carrier may complete one revolution and be positioned to start a new revolution or carrier cycle at approximately the same moment or preferably just after the moment that the table returns to its starting position in readiness for a new table cycle. While it is ordinarly preferred that one revolution or cycle of carrier travel should correspond to one reciprocatory movement or cycle of table travel away from and returning to a zero or starting point located at an extreme end of the table stroke, it will be apparent that this is not necessary and it is contemplated that, for instance when the table movement is comparatively short, one carrier revolution or cycle may be made to correspond to two or more table cycles. In such case a plurality of groups of carrier dogs corresponding to such number of table cycles are mounted on the carrier to come into action one after another, and the driving train for the carrier is adjusted to a ratio producing approximately one carrier revolution or cycle while the table completes the several cycles. In such case a first table cycle need not correspond to a second or other table cycle, for instance the first table cycle may move the table from a predetermined starting point to the left and return it to the same point, while a second or any subsequent table cycle may move it to the right and back to the starting point, or it may make two movements to the left and a third to the right, etc.

Although the table movement may as described be controlled completely from the carrier movement, it is desirable that the tripping or disengagement of the table movement at the end of the table cycle, or at least once per carrier cycle shall be done by means of a table dog, but the table movement thus tripped is preferably started again from a carrier dog. By this means it is insured that the table will regularly be brought back to exactly the same point relative to the cutting tool and that the carrier will invariably be brought into exact cyclic relationship to the table at least once for each carrier revolution.

It is obviously possible with the mechanism here disclosed to stop the table at any point in its movement and permit it to remain stationary for any desired period, following which it may be started again from a carrier dog and caused to complete its cycle. The tripping of the table drive mechanism for such intermediate stops may ordinarily be done either from a table dog or from a carrier dog without preference, except that if the table is to be tripped while the cutter is operating on the work it is preferable that this should be done from a table dog since heavy tripping strain is thereby avoided in the carrier and associated drive and control mechanism and these parts may then be constructed of relatively lesser dimensions.

Simple operations, not requiring control from the carrier dogs may be performed exclusively by the means of the hand control previously described, or may be performed using the hand control to establish table movement and to shift from table feed to quick traverse and vice versa, but using the table dogs to trip the table movement. In either of such cases the carrier may be disconnected from power movement, if desired, by removal of one or more of the gears 55, 56, 57 or 58.

If carrier control is in use it is desirable that the clutch 35 should not be operated by hand lever 51, even by accident, since this would disarrange the relative cycles of table and carrier. It is for this reason that handle 51 is made removable as previously mentioned and as shown in the drawings. When the carrier is in use for the control of table movements the handle 51 is removed, but if for any reason the cycles of table and carrier should become disarranged, the table may be hand adjusted by previously described clutch 90 on lead screw 86 to correct the relative positions of table and carrier.

A previously mentioned hand operated clutch 14a is available to disconnect the entire feed and rapid traverse mechanism from power movement, and the shaft 44 is elongated and provided with a squared end 44b to which a hand crank, not shown, may be applied, a cover 80a being made removable for this purpose, as well as to provide access to the gears 55, 56, 57, 58 and to the carrier dogs. When setting up the machine for automatic table cycles a hand crank applied to the squared end of shaft 44 may be used to cause the table and carrier to execute their movements precisely as though power operated, but as slowly as may be desired whereby the various dogs may be positioned more conveniently and more accurately.

Ordinarily the table having completed its forward travel will be brought back to its starting or zero point, and will then be tripped out or disengaged from power movement by a table dog, the carrier continuing to move to complete its revolution. To produce continuous cycles of table movement, it is only necessary to then permit the carrier to immediately start a new revolution.

Figure 8:
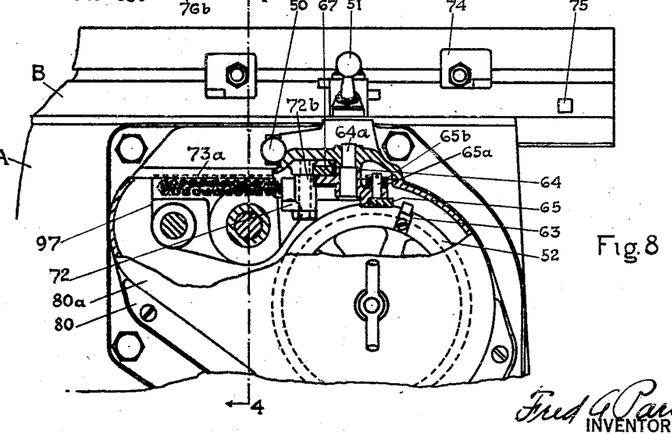
Fig. 8 is a partial front elevation, partially in vertical section, the sectional portion being taken along line 8—8 of Fig. 2.

In other cases it is desirable that after the carrier has completed its revolution as just described it should stop, this being accomplished by interrupting the carrier movement at the feed and quick traverse clutch, thus delaying further movement either of table or carrier until the carrier is started again, since interrupting the movement of the carrier at this point also stops the table. For this purpose additional mechanism is provided as follows:

A lever member 64 is pivoted on a pin 64a fixed in the housing 80 adjacent the carrier and has oppositely extending arms (see Figs. 8 and 9) one of which 64b is engaged with a notch or slot in the rod 67, and the other of which is provided with a latch member 65 pivoted on a pin 65b. Latch 65 sets in a notch in member 64 and is restrained by contact between the notch wall and the side of the latch to a limited movement in each direction on its pivot, being urged in the one direction by a comparatively weak spring 65a to the full limit of its movement. When the rod 67 is shifted in a direction to obtain a quick traverse relationship of the mechanism, the lever 64 is moved thereby to a position where the point of latch 65 is in the path of movement of a removable dog 63 fixed on the carrier 52. The movement of the lever 64 from the dog 63 is opposed by the cam 68b, it being necessary before the dog can move the lever to overcome the cam spring 73a and before this takes place the comparatively weak spring 65a will be overcome and the latch 65 pivoted to its other limit of travel about pivot 65b after which the continued movement of the dog 63 will move latch and lever together and thereby move rod 67 until clutch 45 disengages and the carrier stops. It will be noted that the previously described lost motion between pin 77 and lever 76 now affects the cam 68b when moved from dog 63, to cause it to start its movement later than the disengaging clutch and therefore the cam 68b has not been moved to a position where spring 73a will engage feed clutch 28 immediately upon disengagement of quick traverse clutch 45 as it would do if moved from one of the other carrier dogs. The clutches 28 and 45 will therefore remain in a non-engaged position and the carrier and table both will remain stationary indefinitely, or until the operator desires to start a new cycle of the carrier. To accomplish this the hand lever 50 is moved a trifle in a direction to engage feed clutch 28, this moves cam 68b to a position where such engagement will take place immediately from the action of spring 73a. The carrier now starts to move at a feed rate but instantly thereafter the clutches may if desired be shifted to give a quick traverse rate, the shifting being effected either from hand movement of lever 50 or from a suitable carrier dog this being possible because the latch 65 having by the above described movement of lever 50 been swung out of contact with dog 63, has been returned to its first position under the urging of spring 65a, the latch movement being sufficient to swing the point of the latch around pivot 65b to a position where upon reengagement of quick traverse clutch 45 after disengagement as described the latch will not contact dog 63, but instead will stand behind it in its position occupied before it was contacted by dog 63, the dog 63 having now passed by the latch, the carrier may continue with the new revolution but may be stopped again at its completion.

Thus the carrier if dog 63 is removed will perform continuous cycles of movement and cause any desired cycles of table movement according to the carrier dogs used, or if dog 63 is in place the carrier will perform its cycle and having completed the cycle will stop, but may be immediately or at any subsequent time started again by the operator, but it may be noted that even if dog 63 is in place, carrier movement may still be continuous if when the dog 63 passes the latch 65 the clutches are shifted to a feed position, in which case the dog will not contact the latch.

It will be noted that the carrier, the clutches shifted thereby and the motion transmitting connections whereby such shifting is effected are all closely organized into a single unitary construction with the housing 80, and likewise with the trip elements operable from the table dogs and also the hand control members, the unit thus organized being directly supported from the stationary bed and positioned for the maximum convenience of the operator when in his normal operating position, whereby not only may the normal operative controls be most conveniently grasped but also all the adjustments incidental to the resetting of the various mechanical controls for various work are immediately under the hand and eye of the operator without movement from his normal position.

The carrier 52 may and ordinarily does carry all the dogs necessary for any cycle of table movement with the exception as noted previously that it is ordinarily desirable to have one dog on the table to disengage the table movement. The carrier is removably mounted as previously described. This combination is of great convenience in that a series of dogs once accurately positioned on the carrier may be preserved for future use by removing the carrier and dogs bodily, replacing the carrier thus removed with another for general use, and when desired the carrier may be replaced again to produce the same cycle of table movement without the necessity for adjusting any of the carrier dogs. This is apparent because the carrier cycle is always one revolution of carrier movement and it may be replaced only in one position, while the table cycle may always be adjusted in relative position by the means of the independent adjustment provided by the crank clutch 90 fixed on the table screw.

Having now fully disclosed my invention in one of its preferred forms, I claim:

1. In a milling machine the combination of a movable table, transmission mechanism therefor, including a shiftable clutch member, a control post having motion transmitting connection with said member and having its one end adjacent to a longitudinal edge of said table, a movable control carrier adjacent the other end of said post, a dog on said table, a dog on said carrier and a plurality of dog contacting surfaces fixed with said post respectively adjacent the opposite ends thereof and movable into the path of movement of the respective dogs.

2. In a milling machine having a movable support and transmission mechanism therefor including a clutch member shiftable to interrupt and to establish movement thereof, the combination of a plurality of control means for shifting said clutch, one of said control means including a trip member having provision for removably attaching a hand lever, and the other control means including a carrier and a dog thereon; there being motion transmitting connections operative to transmit motion from said dog to the clutch member, and from said trip member to said clutch member.

3. In a milling machine having a movable support and transmission mechanism therefor including a reverser clutch member shiftable to actuate said support in either direction and clutch means shiftable to opposite positions for actuating said support at a feed or at a rapid traverse rate respectively, the combination of a plurality of dog controlled power trip devices respectively associated with said clutch member and with said clutch means, the trip device associated with said clutch means being normally adapted to shift said clutch means from the one to the other of said positions, and means associated with the last named device to cause it to move the clutch means only to an intermediate position for stopping said support.

4. In a milling machine having a movable support and transmission mechanism therefor, including clutch means shiftable into two positions respectively to actuate said support at a feed and at a quick tranverse rate, the combination of dog controlled shift mechanism associated with said clutch means for causing a quick shifting from the one to the other of said positions at intervals, and trip means operative at intervals to oppose the action of said shift mechanism whereby said clutch means may be maintained in a third position ineffective to cause movement of said support.

5. In a milling machine having a movable support, the combination of a movable transmission controlling carrier, transmission mechanism for actuating said support and said carrier in cycles including a shiftable reverser member having a non-power-transmitting position and effective only on said support, shiftable clutch means adapted to change the rate of actuation both of said support and of said carrier and having a non-power-transmitting position, and a plurality of dogs respectively movable with said support and with said carrier and respectively adapted to move the reverser member and the clutch means to their non-power-transmitting positions through suitable motion transmitting connections.

6. In a milling machine having a movable support the combination of control means including a movable carrier, transmission mechanism including clutch means shiftable to positions respectively effecting a feed and a rapid traverse both of said support and of said carrier, and to a non-power-transmitting position, a dog movable with said carrier, trip means connected for movement of said clutch means and to be moved by said dog and adapted when so moved to quickly shift said clutch means from one to the other of the first named positions, other trip means connected with said clutch means and a second dog on said carrier adapted to contact the last named trip means when said clutch means is in one of the first named positions and to move the clutch means to its non-power-transmitting position.

7. In a milling machine having a movable support and transmission mechanism therefor, including a reverser and including clutch means shiftable to two positions respectively effecting a feed and a quick traverse and to a third non-power-transmitting position, the combination of control means including a dog connected to be driven from said clutch means but independently of said reverser, and adapted to move the clutch means from one of the first named positions to the last named position, and control means for said reverser including a dog deriving motion therethrough.

8. In a milling machine having transmission mechanism for support movement including a reverser and a fast and slow clutch having a neutral position, the combination of control mechanism therefor, including a dog movable from said reverser for controlling the position thereof and a dog movable from said fast and slow clutch independently of the position of said reverser for shifting said fast and slow clutch to said neutral position.

9. In a milling machine having a rotatable spindle, a movable support and support transmission control mechanism including a movable carrier; the combination of transmission mechanism including a power source, a clutch, a shaft driven from said source through said clutch, a feed clutch member, a quick traverse clutch member, a plurality of trains driven from said shaft and respectively connected to drive said spindle and to drive said clutch members through branch trains one of which includes rate change gearing, clutch means shiftable to be alternatively driven from the one or the other of said clutch members, a support driving train including a reverser member and connected with said clutch means, and a carrier driving train including rate change gearing and connected with said support driving train at a point between said clutch means and said reverser.

10. A milling machine as specified in claim 9 in which is provided a plurality of trip means respectively including a dog movable with the support and a dog movable with the carrier, each of said trip means being connected for movement of said reverser member.

11. A milling machine as specified in claim 9 in which is provided a plurality of power trips for shifting said reverser member, the one trip including a dog movable with said support and motion transmitting connections whereby said reverser member may be positioned in a non-power-transmitting position from support movement, and the other trip including a dog movable with said carrier and motion transmitting connections whereby said reverser may be moved from a non-transmitting to one of its power-transmitting positions.

12. In a milling machine having a reciprocable support the combination of transmission mechanism therefore including a shiftable motion reverser member having a non-power-transmitting position and shiftable clutch means having positions effective to transmit a feed or a quick traverse and shiftable to a non-power-transmitting position, and a plurality of control means one of which includes a dog on said support and motion transmitting connections from said reverser member co-operative therewith to shift the reverser member to its non-power-transmitting position, and the other of which includes a movable carrier and a variety of dogs movable with said carrier together with motion transmitting connections both from said reverser member and from said clutch means including portions adjacent said carrier; one of said carrier dogs being adapted to contact one of said portions and thereby move said reverser member from its non-power-transmitting to another position, another of said carrier dogs being adapted to contact another of said portions and thereby move said clutch means from a feed to a quick traverse position, and another of said carrier dogs being adapted to contact another of said portions and thereby move said clutch means to a non-power-transmitting position.

13. In a milling machine having a movable support, the combination of a transmission mechanism including a shiftable motion reverser member having positions effective to transmit a forward or reverse drive to said support and having a non-power-transmitting position, and also including shiftable clutch means having positions effective to transmit a feed or quick traverse and having a non-power-transmitting position, together with control means including a carrier member provided with dogs and associated trip elements whereby both said reverser member and said clutch means may be moved from the movement of said carrier, from any one to any other of their above named positions, and a power train for driving said carrier member and connected with said transmission mechanism at a point unaffected by said reverser member.

14. In a milling machine having a stationary bed and a movable work table, the combination of a rotatable control carrier supported from said bed and having its axis of movement transverse to the movement of said work table, transmission mechanism including a shiftable table reverser member, and a plurality of adjustable control dogs for the shifting of said reverser member including a dog supported from said table and a dog supported from said carrier.

15. In a milling machine having a movable support and clutch controlled transmission mechanism therefor, the combination of control means for said transmission including a movable carrier and a dog thereon, said control means also including a dog on said support, said carrier and first named dog being bodily unitarily removable from and replaceable in their transmission controlling position, and means for the independent movement of said support whereby the dog on said support may be positioned in correct relationship with the dog on said carrier when said carrier is replaced.

16. In a milling machine, the combination of a movable support, transmission mechanism therefor including a power source, a motion interrupting clutch, a reverser and said support in the order recited, a control device; a train for said control device and connected to be driven from said transmission at a point between said clutch and reverser, and means for manually actuating a portion of said transmission when said clutch is in motion interrupting position and connectible with said transmission at a point between said clutch and reverser.

17. In a milling machine the combination of a movable support, transmission mechanism therefor including a power source, a motion interrupting clutch, a plurality of branch lines, a clutch shiftable to connect with the one or the other of said branch lines, a reverser, and said support in the order recited; a control device for said shiftable clutch and reverser, a train for said control device and connected with said transmission at a point between said reverser and shiftable clutch, and means for manually actuating a portion of said transmission when said motion interrupting clutch is in motion interrupting position and connectible with said transmission at a point between said motion interrupting clutch and said shiftable clutch.

18. In a milling machine the combination of a movable support, a transmission therefor including a power source, a motion interrupting clutch, clutch means shiftable to change both the rate and direction of support movement, and said support in the order recited; and means for manually actuating said support when said motion interrupting clutch is in its motion interrupting position and connectible to be operative on said support through said clutch means.

19. In a milling machine, the combination of a movable support, a transmission therefor including a power source, a shiftable clutch and said support in the order recited, a control device for shifting said clutch and connected to be actuated from said transmission at a point between said power source and said clutch, another control device normally connected for shifting said clutch independently of the first mentioned device, and means for disconnecting said other control device to prevent shifting of said clutch therefrom, said means being inoperative on the first mentioned control device.

20. In a milling machine the combination of a movable support, a transmission therefor including a power source, a plurality of branch lines, clutch means shiftable to connect with the one or the other of said branch lines, a shiftable reverser and said support in the order recited; a control device for shifting said reverser and clutch means and connected with said transmission at a point between said clutch means and said reverser, another control device normally connected for shifting said reverser independently of the first mentioned device, and means for disconnecting said other control device to prevent shifting of said reverser therefrom, said means being inoperative on the first mentioned control device.

In witness whereof I have affixed my signature.

FRED A. PARSONS.